Patented Sept. 26, 1933

1,927,988

UNITED STATES PATENT OFFICE 1,927,988

TREATMENT OF SEEDS FOR SOWING

Josef Müller, Weissenstein ob der Drau, Austria

No Drawing. Application September 8, 1932, Serial No. 632,270, and in Austria September 21, 1931

16 Claims. (Cl. 47—58)

The present invention relates to improvements in the treatment of seeds for sowing.

An object of this invention is to increase the sprouting energy of seeds, to vitalize the seeds and to strengthen them.

Another object is to get a stronger development of the plants generated from the seeds and to increase the yield of the harvest. Furthermore the invention aims at preventing the seeds during storage from becoming musty and mouldy.

Seeds for sowing are pickled in order to destroy the parasitic fungi adhering to them and also to protect them from injurious animal organisms. The pickling agents used are chiefly compounds of copper, mercury and arsenic, and cyanides and tar preparations. When the fungi are in the interior of the grain as for instance in the case of barley or wheat smut, the seeds are pickled in hot water. The pickling agents are used either in the form of solutions or in a dry state. In the former case, the seeds for sowing are either spread in layers on a support and sprayed with the pickling liquid (moistening process), or are dipped into the liquid (dipping process). Agents in the form of powder are thoroughly mixed with the seeds. Wet pickled seeds must be sown within a few days, and only the seeds pickled by the dry method may be stored for any length of time.

Among the well known disinfectants, literature on the subject mentions also hydrogen peroxide. The work of Hollrung "Die krankhaften Zustände des Saatgutes", 1919, mentions on page 271, among the substitutes for disinfecting the seeds by destroying the spores of smut adhering to them, hydrogen peroxide with the remark "Dipping pickle 1 percent 15 minutes". It has been further proposed in the case of seed pickles which are based on the action of formaldehyde, to use at the same time substances generating oxygen, such as benzoyl peroxide. These substances are used however in the known process exclusively for eliminating the injurious action of the formaldehyde. As is well known, formaldehyde, though it is a good means for disinfection and destruction of injurious organisms, injures the sprouting capacity of the seeds, more particularly that of sensitive kinds of corn. In order to counteract this injurious effect, the formaldehyde is oxidized to formic acid during the treatment by means of oxygen-generating substances. The substances generating oxygen are therefore consumed in this case by chemical reaction with the formaldehyde.

According to the present invention the seeds are submitted to a treatment with hydrogen peroxide, peroxides or per-salts for a protracted period in the form of a solution or of a suspension or in the form of a dry powder. This treatment must not be considered merely as a pickling, even though an elimination and destruction of organisms injurious to the plants are ensured at the same time.

The new process is based on the startling discovery that a long treatment with the above-mentioned agents chiefly produces an increase of the sprouting energy, vitalization and a strengthening of the seeds so that the development after the sowing, takes place as quickly as is possible in view of the given conditions of soil, without however the growth being excessively accelerated after the manner of stimulating manuring, which may result in the dying of young plants. This effect is produced in any soil and weather conditions. The comparative experiments available show that the plants always grow better than when sown without the treatment or after having been treated in any other manner. The simultaneously produced cleaning of the seeds is probably partly due to the fact that during the catalysis of the oxygen generating agents, the surface of the seeds is freed from the mucous and gum layer to which the injurious organisms adhere, owing to which they lose cohesion with the seeds and are more easily destroyed by the means used.

The treatment according to the invention may be carried out by the moistening process or by the dipping process as well as by the dry pickling process. In the former case diluted aqueous hydrogen peroxide solutions, or an aqueous suspension of peroxides or per-salts may be used for treating the seeds. In the dry process solid peroxides or per-salts such as magnesium peroxide, calcium peroxide, barium peroxide or also solid organic per-compounds, may be used. The dry treatment is applied chiefly when the seeds have to be stored as it is adapted to remove the musty smell of seeds and to improve their storing capacity.

For carrying the process into practical effect, the seeds are completely covered in a large vat with the liquid or also brought in contact with only as little liquid as is required to moisten them, whereupon the seeds are stirred. The procedure may be such that the seeds in a loose heap are treated with a sprayer or atomizer and then frequently turned over with a shovel. The treatment with per-compounds suspended in water or with dry per-compounds is effected chiefly in the second manner. The dry treatment may be applied once or also several times at the occasion of the usual turning over the seeds by shovelling.

The concentration of the hydrogen peroxide solution used should be in most cases between 0.5 and 2% $H_2O_2$, but a higher or lower concentration may also be used when required by the nature or kind of seeds. When solid per-compounds are used, the quantity may vary within wide limits according to the external conditions, (nature and the kind of seeds, depth of layer, etc.).

The length of treatment varies according to the nature and the kind of seeds. It may amount to 12–24 hours when using hydrogen peroxide solutions or suspensions of solid peroxides or per-salts in water. Easily accessible seeds, that is to say, seeds, the husk of which is easily penerated, require as a rule a shorter time of treatment. In some cases excellent results have been obtained with a treatment lasting only, or not even three hours. Longer times of treatment are required for seeds in which only a long action is capable of rendering the outer husk permeable, for instance, with swelling. The essential point in every case is however that the action should not be merely a superficial one on the organisms injurious to the plants adhering in the husk.

When using dry peroxides or per-salts the decomposition takes place more slowly and owing to this fact the treatment should be protracted over long periods, say over days or even up to months. The dry peroxides and per-salts may also be used in such a way, that for instance seeds (grains of cereals etc.) intended for being sowed are mixed with the dry peroxides or per-salts already when stored for winter. The seeds are thereby successfully prevented from becoming musty and mouldy, and perfectly kept fresh during storing. When the season for sowing comes, the oxygen has acted to such a degree that sowing can be effected without further treatment (such as with solutions), all advantages due to a treatment with liquid agents being ensured. Since in addition thereto the dry treatment can be carried out more quickly and in a simpler manner than the wet process and moreover is attached with other advantages, this mode of carrying out the process is a very advantageous one. Of course it is not necessary always to protract the action over the whole period of storing, it suffices to add the dry peroxides or per-salts to the seeds for example some weeks or one month before sowing.

When there is a particularly great danger from organisms injurious to the plants, the treatment described may be combined with an additional treatment by means of usual pickling agents (for instance sublimate, copper sulphate, milk of lime). Where required by the conditions, a fertilizing may be combined with the treatment described, for instance by adding to the solution which may contain also disinfectants, soluble nutritive salts in the form of phosphates, potassium salts and nitrates.

EXAMPLES

*Example 1.*—25 kg. of wheat were pickled in a vat with 20 litres of a 1.5% hydrogen peroxide solution without any other addition. The length of treatment amounted to 20 hours, the temperature to 20° C. The wheat thus treated, without having been dried, was sown in the autumn. In the spring the seeds had developed almost twice as quickly as those on the comparison plot of the same farm on which wheat pickled with milk of lime was sown on an area of the same size.

Also, later on, differences were found, the wheat pickled with hydrogen peroxide gave plants which were stronger in the stalk. Moreover, the development of the ears and grains was distinctly better. The yield was about 20% higher than in the comparison field. Further, the work of mowing was facilitated by the stronger build of the plants.

*Example 2.*—200 gr. of beans were treated previous to the sowing for 15 hours with 50 cbc. cm. of a 2% hydrogen peroxide solution. A comparative experiment was also carried out using the same quantity of water in the usual manner.

The beans treated with hydrogen peroxide came up four days earlier and showed a much stronger development after a short time. The better development continued the whole time, and the rows sown in the same field gave a substantially higher yield than that of the comparison rows with the beans merely soaked in water.

*Example 3.*—Cucumber seeds which had been treated in the same way as the beans according to Example 2, also came up earlier and developed stronger.

*Example 4.*—1 kg. of calcium peroxide with 8% active oxygen was brought into suspension in 10 litres of water. 20 kg. of rye seeds in a loose heap were treated with 10 litres of this suspension at ordinary temperature. An equal quantity of seeds was treated with copper sulphate solution and thereupon with lime. The sowing was done without any washing or drying in the same field. Also in this case it was found that on the experimental field the seeds pickled with calcium peroxide gave yield by about 20% higher. In the case of hail it was found that the plants from the seeds pickled with peroxide, resisted much better on account of the stronger development, and the ripening was therefore much better than on the comparison field.

*Example 5.*—Seeds of wheat, rye, barley, oat, maize, rapes and flax were each mixed with 3% sodium percarbonate in a dry state and then left for two months. After this period the test as to germinating capacity proved that the germinating energies had increased by 5–10% in comparison with the untreated seeds; moreover the plants from the pickled seeds developed much more strongly and more quickly on being examined in the field. In all cases a yield by 10–20% higher than from untreated seeds could be found. Similar results have also been obtained with the use of perphosphates, persulphates and mixtures of these compounds with calcium peroxide. In addition thereto for example a small quantity of perarsenate may be used as disinfectant.

I use the term "true percompounds" to include not only $H_2O_2$ but also salts of acids which are either (1) formed by the action of $H_2O_2$ on the oxyacids, or (2) give rise to $H_2O_2$ when treated with dilute sulphuric acid (true persalts), furthermore true peroxides reacting with acids to give off $H_2O_2$, which behaviour is assumed to be caused by the two oxygen atoms being directly bound to each other.

I claim:

1. A process for treating seeds for sowing consisting in subjecting the seeds to the action of true percompounds for a protracted period.

2. A process for treating seeds for sowing consisting in subjecting the seeds to the action of aqueous hydrogen peroxide solutions for more than one hour.

3. A process for treating seeds for sowing consisting in subjecting the seeds to the action of aqueous hydrogen peroxide solutions of a concentration between 0.5% and 2% for more than one hour.

4. A process for treating seeds for sowing consisting in subjecting the seeds to the action of watery suspensions of true peroxides for a protracted period.

5. A process for treating seeds for sowing consisting in subjecting the seeds to the action of watery suspensions of true persalts for a protracted period.

6. A process for treating seeds for sowing which consists in bringing the seeds into intimate contact with a dry powder of true percompounds for a protracted period.

7. A process for treating seeds for sowing which consists in bringing the seeds into intimate contact with mixtures of true percompounds in the form of a dry powder, for a protracted period.

8. A process for treating seeds for sowing which consists in bringing the seeds into intimate contact with a dry powder of true peroxides of the class including magnesium peroxide, calcium peroxide, and barium peroxide, for a protracted period.

9. A process for treating seeds for sowing which consists in bring the seeds into intimate contact with true persalts in a powdery state of the class including perphosphates and persulfates, for a protracted period.

10. In a process for storing seeds for sowing the step which consists in mixing the seeds with true percompounds in a dry form belonging to the group comprising solid true peroxides and true persalts, and allowing the said seeds to remain in contact with said percompounds until at least part of the percompounds has decomposed.

11. A process for storing seeds for sowing which consists in mixing the seeds with a true percompound in a dry state and allowing the mixture to rest for a protracted period from several days up to months.

12. A process for treating seeds for sowing which consists in subjecting the seeds to the action of true percompounds, in combination with the action of pickling agents.

13. A process for treating seeds for sowing which consists in subjecting the seeds to the action of substances splitting off oxygen of the class including hydrogen peroxide, true peroxides and true persalts, in combination with the action of perarsenate.

14. A process for treating seeds for sowing which consists in subjecting the seeds to the action of true percompounds, in combination with the action of fertilizers.

15. A process for treating seeds for sowing which consists in subjecting the seeds to the action of true percompounds, in combination with the action of pickling agents and fertilizers.

16. A process for treating seeds for sowing consisting in intimately incorporating the seeds with 3% of sodium percarbonate, and allowing the sodium percarbonate to decompose during a protracted period.

JOSEF MÜLLER.